United States Patent
Grundmann et al.

(10) Patent No.: US 11,221,737 B1
(45) Date of Patent: *Jan. 11, 2022

(54) MOTION STILLS EXPERIENCE

(71) Applicant: Google LLC, Mountain View, CA (US)

(72) Inventors: Matthias Grundmann, San Jose, CA (US); Jokubas Zukerman, San Francisco, CA (US); Marco Paglia, San Francisco, CA (US); Kenneth Conley, Mountain View, CA (US); Karthik Raveendran, San Francisco, CA (US); Reed Morse, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/741,091

(22) Filed: Jan. 13, 2020

Related U.S. Application Data

(63) Continuation of application No. 15/187,960, filed on Jun. 21, 2016, now Pat. No. 10,534,503.

(Continued)

(51) Int. Cl.
*G06F 3/0482* (2013.01)
*G06F 3/0485* (2013.01)
(Continued)

(52) U.S. Cl.
CPC .......... *G06F 3/0482* (2013.01); *G06F 3/0485* (2013.01); *G06F 3/04883* (2013.01);
(Continued)

(58) Field of Classification Search
CPC ...... G06F 3/0484; G06F 3/0481; G06F 3/011; G06F 21/32; G06F 3/0482; G06F 3/0488;
(Continued)

(56) References Cited

U.S. PATENT DOCUMENTS

2002/0180774 A1 12/2002 Errico et al.
2005/0071782 A1* 3/2005 Barrett ............... H04N 21/4316
715/838

(Continued)

OTHER PUBLICATIONS

"PHLivePhoto", https://developer.apple.com/library/ios/documentation/Photos/Reference/PHLivePhoto_Class/index.html#//apple_ref/occ/cl/PHLivePhoto, Oct. 21, 2015, 2 pages.

(Continued)

*Primary Examiner* — Rayeez R Chowdhury
(74) *Attorney, Agent, or Firm* — Lowenstein Sandler LLP

(57) ABSTRACT

The technology disclosed herein includes a user interface for viewing and combining media items into a video. An example method includes presenting a user interface facilitating a creation of a video from a plurality of media items, wherein the user interface displays video content of the first and second media items in a first portion; receiving user input in the first portion of the user interface, wherein the user input comprises a selection of the first media item; updating the user interface to comprise a control element and a second portion, and adding the first media item to a set of selected media items, wherein the second portion displays image content of the set of selected media items and the control element enables a user to initiate the creation of the video; and creating the video based on video content of the set of selected media items.

20 Claims, 6 Drawing Sheets

Related U.S. Application Data

(60) Provisional application No. 62/345,984, filed on Jun. 6, 2016.

(51) Int. Cl.
    *G11B 27/028*    (2006.01)
    *G11B 27/029*    (2006.01)
    *G06F 3/0488*    (2013.01)
    *H04N 5/262*    (2006.01)

(52) U.S. Cl.
    CPC .......... *G11B 27/028* (2013.01); *G11B 27/029* (2013.01); *H04N 5/2628* (2013.01)

(58) Field of Classification Search
CPC ............. G06F 3/04883; G06F 3/04817; G06F 3/04845; G06F 3/017; G06F 3/04842; G06F 3/04847; G06F 1/1626; G06F 1/1694; G06F 21/34; G06F 3/04815; G06F 16/435; G06F 16/9535; G06F 21/10; G06F 21/6245; G06F 2221/0713; G06F 3/016; G06F 3/167; G06F 40/205; G06F 9/453; G06F 16/243; G06F 16/2474; G06F 16/9537; G06F 1/1686; G06F 21/55; G06F 2200/1614; G06F 2203/04806; G06F 2221/034; G06F 3/012; G06F 3/013; G06F 9/54; G06F 16/951; G06F 21/33; G06F 21/44; G06F 21/6218; G06F 21/6263; G06F 3/00; G06F 3/04886
See application file for complete search history.

(56) References Cited

U.S. PATENT DOCUMENTS

| | | | |
|---|---|---|---|
| 2006/0064733 A1 | 3/2006 | Norton et al. | |
| 2007/0244984 A1 | 1/2007 | Svendsen | |
| 2010/0254672 A1* | 10/2010 | Gottlieb | H04N 7/155 386/278 |
| 2010/0313166 A1* | 12/2010 | Nakayama | G06F 3/0482 715/810 |
| 2011/0075727 A1* | 3/2011 | Van Vleck | H04N 17/004 375/240.02 |
| 2011/0193978 A1* | 8/2011 | Wu | G06T 7/207 348/208.6 |
| 2014/0229894 A1* | 8/2014 | Vinna | G06F 16/639 715/810 |
| 2016/0225408 A1* | 8/2016 | Khan | H04N 5/772 |
| 2017/0357382 A1 | 12/2017 | Miura et al. | |

OTHER PUBLICATIONS

"IOS 9.1, https://developer.apple.com/library/ios/releasenotes/General/WhatsNewIniOS/Articles/iOS9_1.html", Mar. 1, 2016, 2 pages.
https://developer.apple.com/library/ios/releasenotes/General/WhatsNewIniOS/Articles/iOS9_1.html, Mar. 1, 2016.
Zibreg, Christian, "Instagram Update brings the Ability to Combine Several Clips into one Video", Apr. 11, 2016, https://www.idownloadblog.com/2016/04/11/instagramcombine-multiple-clips/, 4 pages.

* cited by examiner

MOTION STILLS EXPERIENCE

CROSS-REFERENCE TO RELATED APPLICATIONS

The present application is a continuation of application Ser. No. 15/187,960, filed Jun. 21, 2016, which claims the benefit of U.S. Provisional Application No. 62/345,984, filed Jun. 6, 2016, both of which are incorporated by reference herein in its entirety.

TECHNICAL FIELD

This disclosure relates to the field of image processing and, in particular, to a user interface for viewing and combining media items.

BACKGROUND

Many computing devices include content sharing aspects that allow users to capture, view, and share content, such as video content, image content, audio content, text content, and so on (which may be collectively referred to as "media items"). Such viewable and shareable media items may include amateur content such as video blogging, short original videos, pictures, photos, other multimedia content, etc. Users may use computing devices (such as smart phones, cellular phones, laptop computers, desktop computers, netbooks, tablet computers, network-connected televisions) to edit, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes presenting a user interface facilitates a creation of a video from a plurality of media items, the user interface that comprising a first portion concurrently playing a first media item and a second media item of the plurality of media items. The method may also involve receiving user input indicating a selection of the first media item in the first portion of the user interface. In response to determining that the user input is of a first type, adding the first media item to a set of selected media items, and presenting the set of selected media items in a second portion of the user interface and creating the video from the set of selected media items.

In one implementation, the first media item and the second media item may each comprise a still image and a video clip that are captured in parallel. The video clip may comprise content from before and after the still image is captured. The still image of the first media item and the video clip of the first media item may be linked together and stored in different formats. In one example, the first media item and the second media item playing in the first portion of the user interface are looping video clips and the first portion may present the playing video clip of the second media item adjacent a still image of a third media item when image processing of the third media item is incomplete. The first and second portions of the user interface may be displayed concurrently and the second portion of the user interface may display still images of the set of selected media items. The first portion of the user interface may enable scrolling along a first axis and the second portion of the user interface may enable scrolling along a second axis, wherein the first axis and the second axis are perpendicular axes.

In another implementation, the method may search a persistent data storage for multiple media items that each comprise a still image and a video clip and modify the video content of each video clip of the multiple media items before presenting a respective media item in the first portion of the user interface. The modifications may involve performing image stabilization on the first media item after retrieving the first media item from persistent data storage. The image stabilization may be performed by a computing process that is separate from the computing process that initiates the capture and processing of the first media item and the second media item. The image stabilization may crop and zoom a portion of the first media item's video clip to reduce movement of an object without changing the dimensions of the portion of the video clip. The image stabilization may also trim a portion of a video clip of the first media item in response to detecting movement that exceeds a predefined threshold, wherein the portion of the video clip that is trimmed is at the end of the video clip.

In a further implementation, the method may involve receiving user input indicating a selection of the first media item in the first portion of the user interface. The user input may be of a first type, a second type, or a third type, which may comprise swiping gestures in different directions. In one example, the method may include receiving additional user input and in response to determining that the additional user input is of a second type, scrolling the plurality of media items in the first portion of the user interface. In response to determining that the additional user input is of a third type, removing the first media item from the first portion of the user interface.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

DETAILED DESCRIPTION

Figure 1:
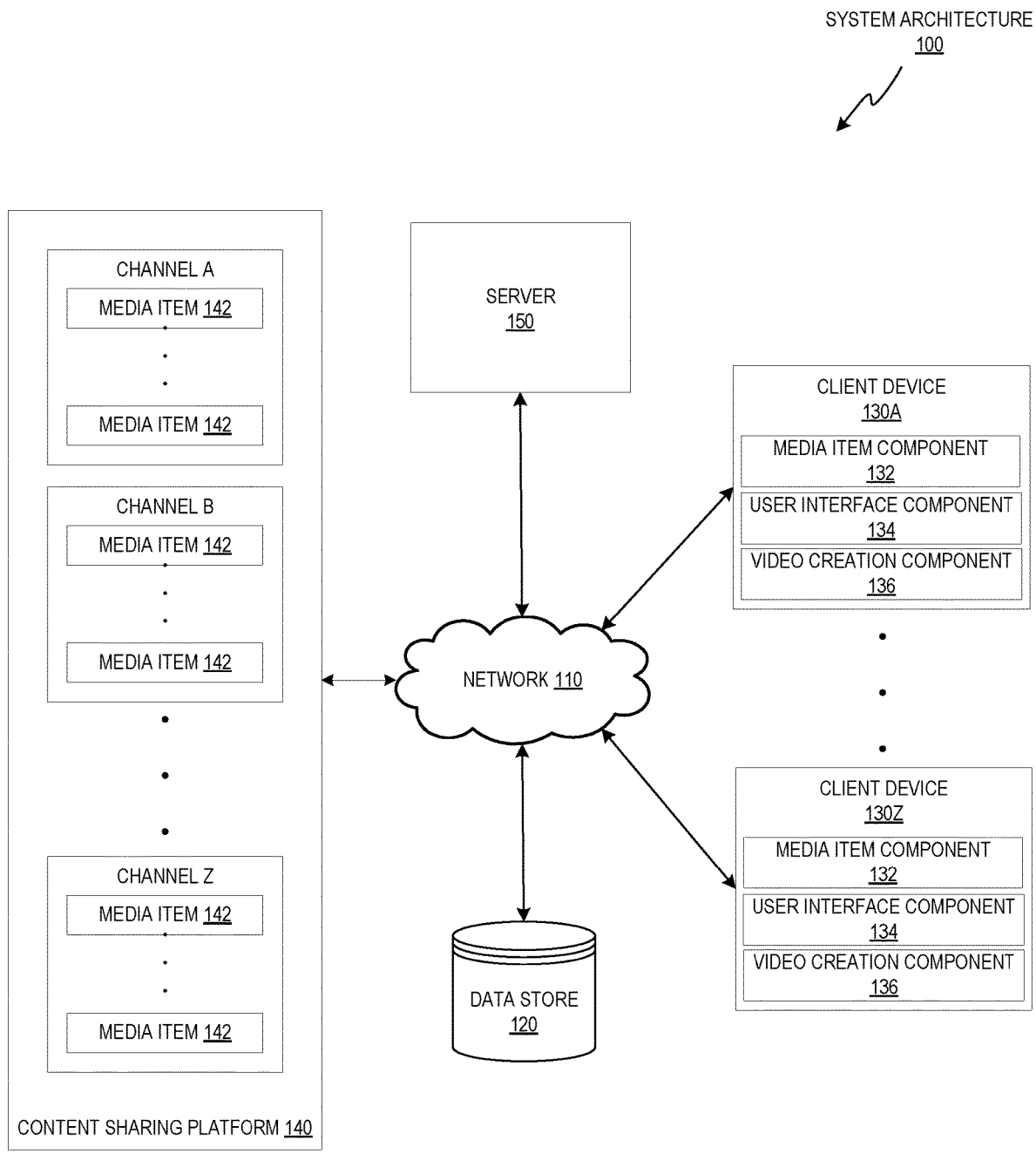
FIG. 1 illustrates an exemplary system architecture in accordance with an implementation of the disclosure.

Aspects and implementations of the disclosure are directed to technology for simplifying user creation of quality videos. Amateur users are often not comfortable with creating videos, and prefer taking photographs because they find it easier for capturing a moment. Videos that are created by non-professional users are often short (e.g., a few seconds or minutes) and have a single shot format. The videos are usually taken by a mobile phone and tend to be "shaky," because the mobile phone is held by a single hand that may be moving. As a result, many videos of amateur users tend to be uninteresting and/or of poor quality.

Some mobile phones simplify the process of taking a video by capturing a short video clip when a user takes a photograph with their mobile phone using a mobile phone camera in a photo shooting mode. The short video clips are usually "shaky", and if a user wants to play the short video clip, the user may need to navigate to the photo and provide additional input (e.g., force touch) to initiate the playback of the corresponding short video clip. However, mobile phones generally do not allow the user who is viewing the playing video clip to combine this video clip with other video clips.

With respect to videos taken by users with their mobile phones' cameras in a video shooting mode, traditional mobile devices often include applications for viewing videos and separate applications for combining videos. Applications for viewing videos may include gallery applications that display multiple videos individually or in a grid layout. A gallery application may enable a user to view the multiple videos. However, in order to combine any of these videos, a user typically has to access a separate creation application. The creation application may require the user to navigate to each of the videos that the user already viewed in the gallery application. Requiring multiple separate applications to view and combine videos may limit the user experience and discourage the creation and sharing of content.

Implementations of the disclosure overcome the limitations of the prior solutions by integrating a media item viewing experience with a content creation experience. In one example, a user interface with multiple portions for presenting media items is provided. Each media item may include a still image and a short (e.g., a few seconds) video clip that are captured in parallel. The video clip may include content of the still image and content from before and after the still image was captured. The video clip may be modified to provide enhanced image stabilization prior to being displayed in a first portion of the user interface. The first portion may concurrently display multiple media items side by side and each media item may be represented by a playing version of its video clip (e.g., grid of looping video clips). The first portion may receive user input (e.g., swiping gestures) that enable a user to scroll through the media items and select media items to be added to a set. The second portion of the user interface may display the set of selected media items as still images and may receive user input that enables the user to scroll, remove, and rearrange the selected media items. The user interface may also include a control element capable of receiving a user request to combine the set of selected items into a video and to display, store, or share the resulting video.

In one example, the implementations disclosed may provide a user interface for a media gallery application that may receive user input (e.g., swipe gesture) to transition the user interface from a viewing mode (e.g., first portion) into a viewing and content creation mode (e.g., first and second portions). This may enable a user to view media items and select one or more of the media items to be combined, at which point a second portion (e.g., video tray) may be provided to display and arrange the media items that are selected. This improves the user's viewing experience and may also improve overall creation and sharing of videos with a content sharing platform. In addition, implementations of the disclosure significantly lower the complexity of a video creation process for mobile device users.

FIG. 1 illustrates an example system architecture 100, in accordance with one implementation of the disclosure. The system architecture 100 includes a network 110, a data store 120, client devices 130A through 130Z, a content sharing platform 140, and a server 150. In one implementation, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 120 may be a memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers).

The client devices 130A through 130Z may each include computing devices such as personal computers (PCs), laptops, mobile phones, smart phones, tablet computers, netbook computers, network-connected televisions, etc. Client device 130A through 130Z may also be referred to as "user devices." Each client device may include a mechanism for capturing media items, such as a camera, microphone or other device for receiving a digital or analog signal and persisting the signal onto a storage medium. The camera or other similar device may be capable of capturing still images (e.g., photos), videos, or a combination of both. Such a camera may be, for example, in a photo shooting mode to capture still images, or in a video shooting mode to capture videos. A camera may also have a moving photo indicator that can be enabled when the camera is in the photo shooting mode to create a short video clip when the user uses the camera to take a photograph.

In some implementations, each client device 130A-130Z may include a media item component 132, a user interface component 134, and a video creation component 136 that function together (e.g., as a mobile application) to present media items and enable a user to combine one or more of the media items into a video. Media item component 132 may discover media items on the client device and may process the media items to enhance the presentation of the media items. In one example, this may involve performing image stabilization on the media items to reduce the movement of an object within the media item. In another example, this may involve clustering the media items to find similar media items and selecting one representative media item to reduce the presence of redundant media items. User interface component 134 may provide a user interface with multiple graphical portions with embedded media player functionality. A first graphical portion may display the media items discovered by media item component 132 and a second graphical portion may display the media items that have been selected by a user. The media items may be displayed using one or more media players. The media players may be provided locally by client device (e.g., operating system feature or application feature) or may be provided by a remote device (e.g., content sharing platform 140). User interface component 134 may enable a user to interact with the graphical portions using any form of user input such as taps, gestures, or other movements. The interactions may indicate which of the media items are being selected. Video creation component 136 may combine the selected media items into a new video and may apply one or more effects to the new video (e.g., video fade, text overlay).

In general, functions described in one implementation as being performed by the client device can also be performed on a content sharing platform 140 or server 150 in other implementations, if appropriate. In addition, the functionality attributed to a particular component can be performed by different or multiple components operating together. The content sharing platform 140 can also be accessed as a service provided to other systems or devices through server 150 via appropriate application programming interfaces, and thus is not limited to use in websites.

In one implementation, the content sharing platform 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 140 may allow a user to consume, upload, search for, approve of ("like"), dislike, and/or comment on shared media items. The content sharing platform 140 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 140.

The content sharing platform 140 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

In some implementations, media item component 132, user interface component 134, and video creation component 136 of client device 130A may enable a user to view media items and combine media items. The combined media items (e.g., video) may be subsequently stored on or sharing with content sharing platform 140 and/or with other third party social network servers. Further description of components 132, 134, and 136 and their specific functions are described in more detail below with respect to FIG. 2.

In situations in which the systems discussed here collect personal information about users, or may make use of personal information, the users may be provided with an opportunity to control whether the content sharing platform 140 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 140.

Figure 2:
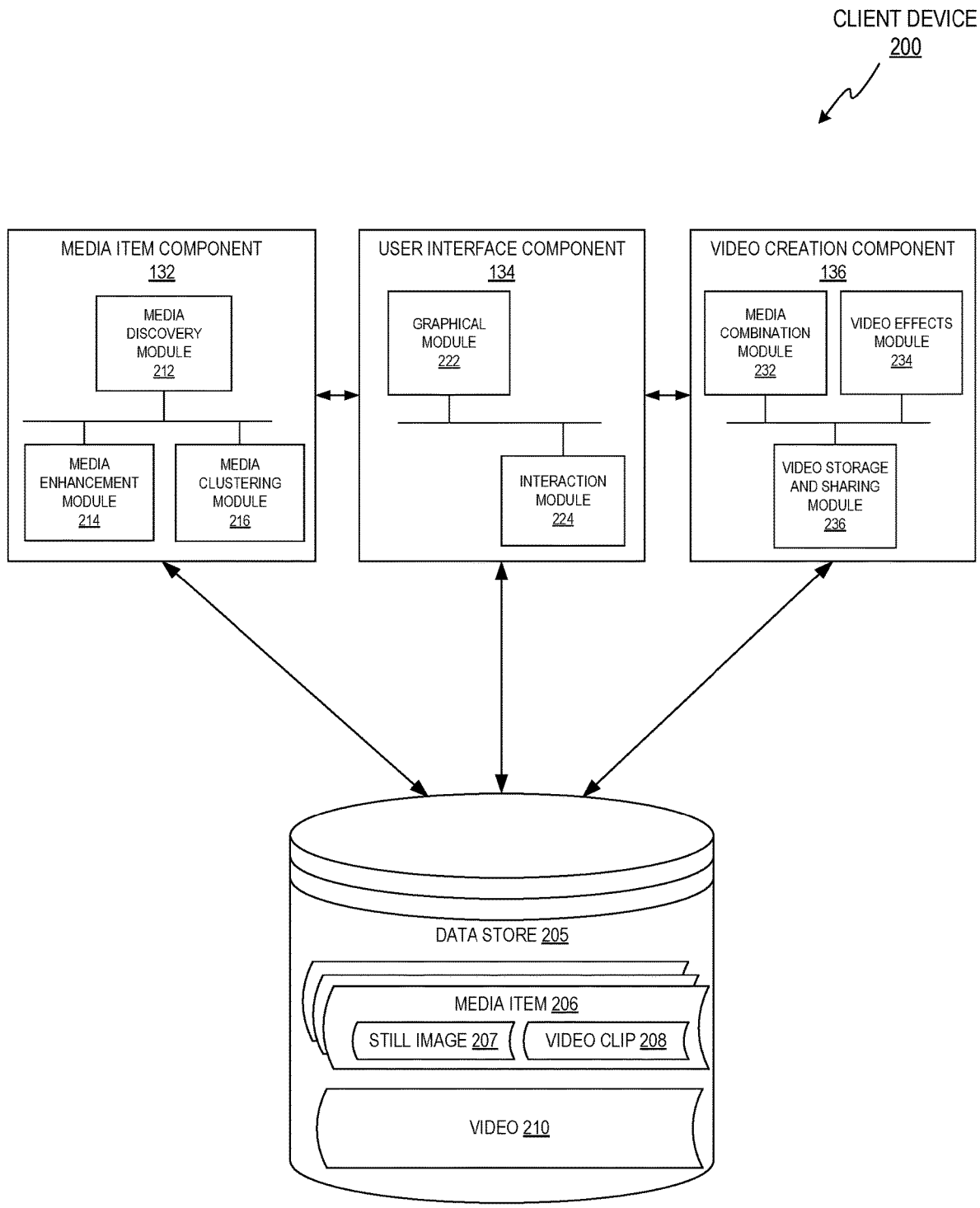
FIG. 2 illustrates an exemplary client device in accordance with an implementation of the disclosure.

FIG. 2 illustrates an example client device 200 in accordance with one implementation of the disclosure. Client device 200 may be the same or similar to client devices 130A-Z. The components and modules displayed in FIG. 2 may be implemented by one or more applications, operating system features, or a combination thereof. Client device 200 may include a data storage 205, a media item component 132, a user interface component 134, and a video creation component 136 that may function together to present media items and enable a user to combine one or more of the media items into a video.

Data storage 205 may include persistent data storage (e.g., flash storage) or non-persistent data storage (e.g., memory) and may be local to client device 200, remote from client device 200, or a combination thereof. Local data storage may be internal to client device 200 and may include embedded storage, removable storage, or other type of storage. Remote data storage may be external to client device 200 and may be accessible by client device 200 over a network. In one example, the data storage 205 of client device 200 may include a combination of local data storage that comprises embedded data storage and remote data storage that may be cloud based data storage. Data storage 205 may be used by computing device 200 to store one or more media items 206.

Media item 206 may be any form of media or multimedia that may be presented by computing device 200 and may include images, text, videos, audio, other media or a combination thereof. In the example shown in FIG. 2, media item 206 may be a combined media item that includes a combination of a still image 207 and a video clip 208. Still image 207 may be any single or individual image that is not an element or frame of a video and may include a photograph, a drawing, a picture, or other image, or combination thereof. Video clip 208 may be any moving visual media and may include a sequence of images (e.g., frames). Video clip 208 may include content of still image 207 and content from before and after still image 207 was captured. The duration of content from before or after may range from a fraction of a second to one or more seconds, minutes, or hours and in one example may include content (e.g., video footage) from 1.5 seconds before and 1.5 seconds after capturing the still image. Video clip 208 may include an audio clip, which may be any acoustic or audible signal that can represent sound and be used by client device 200 to produce sound. In one example, media item 206 may include a combination of a still image 207 and a video clip 208 that are captured in parallel by one or more computing devices. The computing devices may include one or more cameras and microphones and may include client device 200, another computing device, or a combination thereof. In another example, media item 206 may be captured by a mobile device camera in a "photo" shooting mode (e.g., with a moving photo indicator enabled).

Media item component 132 may discover media items that are accessible to client device 200 and may process the media items to enhance the presentation of the media items. In one example, media item component 132 may include a media discovery module 212, a media enhancement module 214, and a media clustering module 216. Media discovery module 212 may search for media items that are available on data storage, such as data storage 210. Searching for media items may involve accessing, querying, scanning, or other operation to identify media items. In one example, media discovery module 212 may scan data storage 205 for a particular form of media item (e.g., media item 206) that includes a combination of a still image and a video clip, which are captured in parallel. Media discover module 212 may identify these forms of media items by searching metadata (e.g., tags, links) that indicate the media item is a combined media item and not an individual image or individual video clip. The metadata may be stored as a part of a media item file or may be stored in an index (e.g., file or database record) that identifies the media items or properties of the media items.

Media enhancement module 214 may receive data identifying one or more media items and may process the media items to enhance the media item. The enhancements may include performing image stabilization, cropping, zooming, trimming, other image processing techniques, or combination thereof. The image stabilization process may include filters (e.g., cinematic stabilization filters) that reduce vibrations within video clips by smoothing the transition from one frame to another frame. The image stabilization process may correct a non-stabilized image by tracking the movement of pixels in the image and correcting the image by moving the frame. The image stabilization process may use pixels outside the border of a visible frame to provide a buffer for the motion and may shift frames of the video clip to counteract the motion. The image stabilization may also crop the image to hide the shifting of the frame or attempt to recreate the lost portion of the image at the edge of the frame by performing a zoom technique, extrapolation technique (e.g., spatial extrapolation, temporal extrapolation), other technique, or a combination thereof.

Media enhancement module 214 may incorporate sensor data from movement sensors (e.g., accelerometer, GPS, proximity) to enhance the media item. In one example, the image stabilization process may involve a warp reduction technique for reducing or eliminating image warping. The warp reduction technique may involve analyzing movement (e.g., z-axis rotation) of the computing device that occurs while the computing device is capturing a media item. The warp reduction technique may detect the movement and apply a counter movement (e.g., opposing z-axis rotation) to the image to stabilize the image. In one example, the image stabilization process may stabilize the image along a first and second axis (e.g., x-axis, y-axis) using cropping and may stabilize the image along a third axis (e.g., z-axis) using the warp reduction technique.

The image stabilization performed herein may be different from the image stabilization performed as a pre-processing step within a camera because this image stabilization may be performed after a video clip is retrieved from persistent storage and may be considered post-processing image stabilization. Post-processing image stabilization may be advantageous because there may be more computing power and time available to analyze a particular frame as well as frames before and after the particular frame.

Media enhancement module 214 may also trim video clip 208 to reduce or remove portions of video clip 208 that include movement that exceeds a threshold. For example, video clip 208 may include video before and after the still image was taken, which may capture movement that occurred when the client device is retrieved from or returned to a stowage area (e.g., pocket, bag, table). The motion of the client device may make a portion of the video clip appear blurry and may be detected and trimmed from the video clip.

Media clustering module 216 may group similar media items 206 and select one or more representative media items to be subsequently displayed. Media clustering module 216 may be performed on any part of the media item (e.g., still image, video clip) and may detect similar media items and group them together using a grouping algorithm. The grouping algorithm may be based on a classification algorithm, a clustering algorithm, other algorithm, or combination thereof. The grouping algorithm may analyze multiple media items and identify similarities between the media items. The similarities may be based on metadata of the media item (e.g., location, time/date), content of the media item (e.g., objects, image characteristics, sounds), other aspects of the media item, or a combination thereof. Media clustering module 216 may be advantageous because it may be used to detect duplicate media items and may enable the user interface to avoid displaying the duplicate media items.

User interface component 134 may provide a user interface with multiple graphical portions and may enable a user to select and arrange a set of media items. The user interface may provide one or more modes, such as a mode for viewing content and a mode for viewing and creating content. The viewing mode may display multiple media items and the viewing and creation mode may concurrently display the available media items in a first portion and the user selected media items in a second portion. In one example, the user interface may enable a user to seamlessly transition between modes by swiping across one of the media items. For example, when a user swipes a media item the user interface may add the media item to a set of selected media items and display the set of selected media items beside or below the other media items. The user interface is discussed in more detail below in regards to FIGS. 3 and 4.

In the example shown in FIG. 2, user interface component 134 may include a graphical module 222 and an interaction module 224. Graphical module 222 may generate and render multiple portions of the graphical user interface on a display device of computing device 200. The multiple portions may include a first portion that displays the media items discovered by media item component 132 and a second portion may display the media items that have been selected by a user. The user interface may also include a third portion that may be used to display a particular media item or the resulting combination of the media items (e.g., combined video). The first portion and the second portion of the user interface may organize the media items along respective media grids. A media grid refers to a sequence, stream, feed, or other arrangement of adjacent media items. In one example, the first portion of the user interface may include a first media grid and the second portion of the user interface may include a second media grid. The first and second media grids may both be capable of scrolling but may scroll along different axes and in different directions. For example, the first media grid may scroll along a first axis (e.g., vertical axis) and the second media grid may scroll along a second axis (e.g., horizontal axis) and these axes may be perpendicular (e.g., 90°), parallel (e.g., 0°, 180°) or other angle (e.g., 45°) with respect to one another.

Interaction module 224 may enable a user to interact with the graphical portions using any form of user input. The user input may involve input to a touch enabled display, touch pad, forward facing camera, or other input device and may include direct contact (e.g., touch, multi-touch) or proximity contact (e.g., movement detected by a camera). The user input may be detected by the user interface and analyzed to determine a type of the user input. In one example, the types of user input may be different types of gestures and may be used to scroll the media grids, hide media items within the grid, add media items from the first media grid to the second media grid, and to rearrange or remove media items from the set of selected media items displayed by the second media grid. The various types of user input will be discussed in more detail in regards to FIG. 3.

Video creation component 136 may combine the set of selected media items to create a new video that may be stored or shared. In one example, video creation component 136 may include a media combination module 232, a video effects module 234, and a video storage and sharing module 236. Media combination module 232 may access the set of selected media items that are displayed by the second portion of the user interface. Media combination module 232 may then access the video clip for each of the media items in the set of selected media items and combine the video clips to create a new video. Combining the video clips may involve appending, merging, concatenating, or other operation to join the video clips to form a new video. The new video may be stored in the same format as one of the video clips or may be stored in a different format. The format may be any video file format such as MPEG-4, VP9, H.264, GIF, and may include video data, audio data, or a combination thereof.

Video effects module 234 may modify the new video to add one or more effects. The effects may be located at any point in the video such as at the beginning of the video, end of the video, between the selected video clips within the video, at another point in the video or a combination thereof. The effects may include annotations (e.g., text, tags, markers), transitions (e.g., fade, dissolve, overlay), other effects, or combination of effects that modify the video.

Figures 3A, 3B:
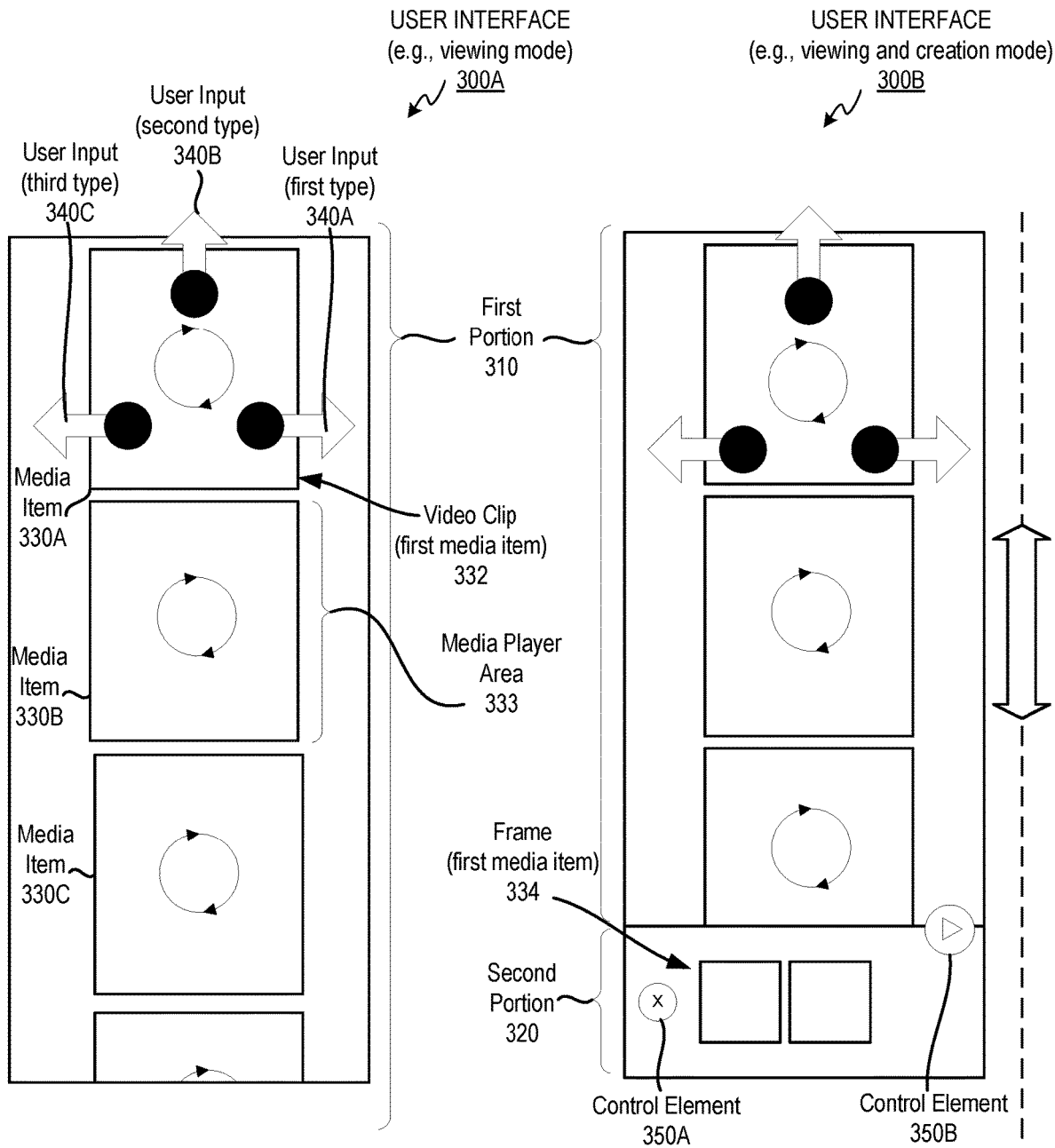
FIGS. 3A-B are example graphical user interfaces for viewing and combining media items in accordance with an implementation of the disclosure.

FIGS. 3A and 3B provide exemplary user interfaces that include one or more portions for displaying and combining media items. FIG. 3A is an example of the user interface in a viewing mode and FIG. 3B is an example of the user interface in a viewing and creation mode. FIGS. 3A and 3B may include first portion 310, second portion 320, media items 330A-C, media player area 333, user input 340A-C, and control elements 350A and 350B.

First portion 310 and second portion 320 may each include a media grid that may concurrently display a sequence, stream, feed, or other arrangement of adjacent media items. Each adjacent media item may be displayed in a media player area 333, which is the portion of the user interface that presents (e.g., displays or plays) a media item. Each media player area 333 within in the media grid may be provided by a single instance of a media player or may each be provided by a separate instance of one or more different media players. The media player may be capable of interpreting (e.g., decoding) a media item and rendering the media item. The media player may be native to the operating system or application or may be provided by a remote computing device such as a server or content sharing platform.

As shown in FIG. 3B, the media grid may have a width of a single media item and may appear similar to a column (e.g., first portion 310) or row (e.g., second portion 320) of consecutive media items. In other examples, a media grid may have any number of rows or columns and may be oriented in any direction (e.g., horizontal, vertical, angled). Each media item may be represented in the media grid as a running (playing) video clip 332, a frame 334 of video clip 332, a still image, or a combination thereof. Each of the media grids may concurrently display a portion of one or more media items and may be scrolled to expose additional media items or an additional portion of a partially exposed media item. The media grid in first portion 310 may scroll along a first axis 352 and the media grid in second portion 320 may scroll along a second axis 354. In one example, first axis 352 and second axis 354 may be perpendicular to one another.

As show in FIG. 3B, first portion 310 may include a first media grid that concurrently displays a running (playing) video clip 332 for each of the corresponding media items visible in the display of the computing device. Second portion 320 may include a second media grid that concurrently displays a frame or a still image 334 for each of the corresponding media items. In other examples, either media grid may display running videos for some of the media items and still images for other media items. A still image may be displayed for a media item if the video clip is still being processed (e.g., undergoing image stabilization or other enhancements). After the processing completes, a running version of the video clip may replace the corresponding still image in the media grid. In one example, the running video clips may be looping videos as is illustrated by the looping circle at the center of video clip 332. A looping video may continuously repeat or may temporarily repeat for any duration of time, such as one or more seconds, minutes, or hours. The looping video clip may repeat the entire video clip or just a portion of the video clip. For example, the original video clip may be automatically trimmed by the client device and the resulting trimmed video may be looped or only the portion that has the least blur (e.g., least movement) may be looped.

Any portion of the user interface can support user input, which may involve input to a touch enabled display, touch pad, forward facing camera, or other input device. The user input may include direct contact (e.g., touch, multi-touch) or proximity contact (e.g., movement detected by a camera). The user input may be detected by the user interface and analyzed to determine a type of the user input. FIG. 3 illustrates three exemplary types of user input 340A-C. User input 340A-C may be, for example, different types of gestures and may identify a media item or media grid and may indicate a user request to perform a particular action with respect to the identified media item.

User input 340A may be a first type of user input that causes a media item to be added to a set of selected media items. User input 340A may be a swipe gesture toward a first direction (e.g., right) and may originate or pass by a particular video clip 332 (e.g., first media item) and may drag or move the video clip 332 along the direction of travel. User input 340A may result in a transition from a viewing mode illustrated by user interface 300A to a viewing and creation mode illustrated by user interface 300B. The transition results in the introduction of second portion 320, which displays the set of selected media items. Second portion 320 may be below first portion or may overlay first portion 310 (e.g., decreasing the size of first portion 310).

User input 340B may be a second type of user input and may identify a media grid and may include a directional component along a second direction (e.g., up) that aligns with first axis 352 and may cause the media grid to scroll along first axis 352. User input 340C may be a third type of user input and may cause a media item to be hidden from the media grid in first portion 310. User input 340C may be a swipe gesture toward a third direction (e.g., left) and may originate or pass by a particular video clip 332 and may drag the video clip 332 along the direction of travel and result in the media item being removed from the media grid. An additional user input (not shown) may be a tap or a touch gesture that identifies a particular media item and transitions user interface 300A or 300B to user interface 400. User interface 400 may enable the user to view and modify the media item and will be discussed in more detail in regards to FIG. 4.

Control elements 350A and 350B may be any graphical control element (e.g., button) that can receive user input and initiate one or more operations. Control element 350A may enable a user to remove or hide second portion 320 and transition from user interface 300B back to user interface 300A. In one example, this may remove the second portion 320 and remove all of the media items from the set of selected media items. In another example, this may hide the second portion 320 without modifying the set of selected media items. In the latter example, a user may subsequently provide user input 340A to add a media item to the existing set of selected media items and unhide second portion 320. Control element 350B may enable a user to initiate the combination of the set of selected media items to create the new video. Control element 350B may also adjust first portion 310 to replace the media grid with the newly created video for display and subsequent modification.

Figure 4:
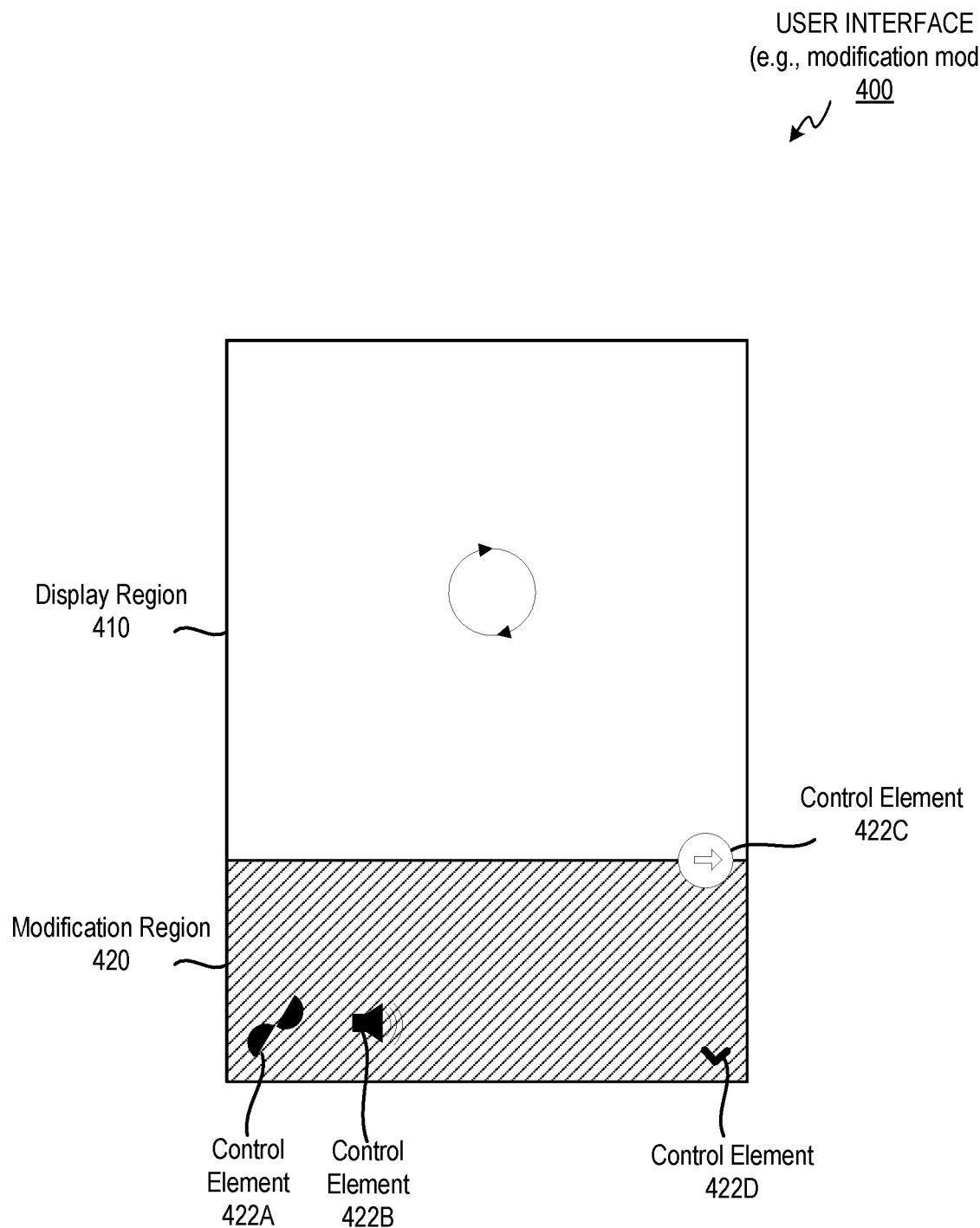
FIG. 4 is another example graphical user interface for viewing and modifying media items in accordance with an implementation of the disclosure.

FIG. 4 includes another exemplary user interface 400 for displaying and modifying a particular media item. A user may navigate to user interface 400 from user interface 300A or 300B by selecting (e.g., tapping) a media item. User interface 400 may include a display region 410, a modification region 420, and control elements 422A-D. Display region 410 may display the selected media item in a manner similar to media grid, such as, by playing the looping video clip or a still image of the media item. User interface 400 may also present an audio clip in sync with the video clip. This may be different from user interface 300A and 300B, which may not provide audio when displaying multiple media items.

Modification region 420 may enable the user to modify the media item being displayed in display region 410. Modification region 420 may include any number or arrangement of control elements for initiating modification operations on the media item (e.g., video clip or still image). In the example, shown in FIG. 4, modification region 420 may include optional control elements 422A and 422B. Control element 422A may add or remove enhancements (e.g., toggle enhancements) to the video clip of the media item. In one example, activating control element 422A may remove the image stabilization and related enhancements (e.g., trimming) made to the video. Control element 422B may add or remove the audio of the media item.

Changes made to the media item in user interface 400 may be reflected in user interface 300A and 300B, as well as, in a new video. User interface 400 is advantageous because it may enable the user to add a particular media item with different configurations to the set of selected media items. For example, a user may add the media item as a first version, which may default to including image stabilization enhancements and audio data. The user may remove image stabilization and re-add the media item as a second version and subsequently remove audio and re-add the media item as a third version. The resulting video would include all three versions of the same media item, the first version to play would have both image stabilization and audio, the second version to play would have audio but no image stabilization, and the third version of the media item would have no audio and no image stabilization.

Control element 422C may present the user with multiple options that enable the user to store or share the resulting video. The user may store the video on the local device (e.g., data storage 210) or may share the video. The user may share the video as a GIF that has video data without audio data or as a video (e.g., MP4, VP9) with both video data and audio data. Control element 422D may enable the user to hide modification region 420 and return to user interface 300B.

Figure 5:
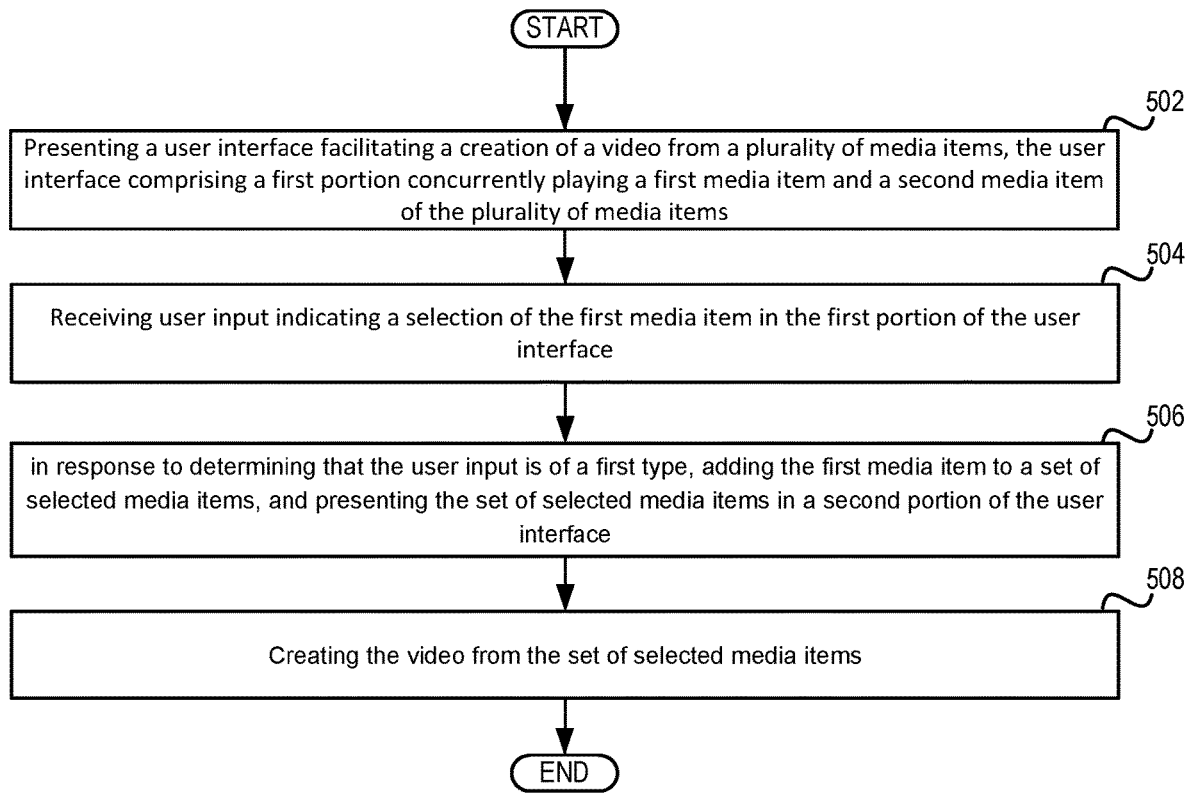
FIG. 5 is a block diagram illustrating a method for viewing and combining media items into a new video in accordance with an implementation of the disclosure.

FIG. 5 includes a flow diagram illustrating an exemplary method 500 for presenting and combining media items in accordance with an implementation of the disclosure. Method 500 may execute on a client computing device and may allow a user to select and arrange media items that are to be included in a new video. Method 500 may be performed by processing logic that includes hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 5, method 500 may be performed by one or more processing devices of client devices 130A or 200 of FIGS. 1 and 2 respectively. Method 500 may begin at block 502, where a processing device may present a user interface facilitating a creation of a video from a plurality of media items. The user interface may include a first portion concurrently playing a first media item and a second media item of the plurality of media items. The first media item and the second media item may each comprise a still image and a video clip that are captured in parallel. The video clip may comprise content from before and after the still image is captured and the still image and the video clip may be linked together and stored in different formats. In one example, the first portion of the user interface may play looping video clips for each of the first media item and the second media item and may present the video clip of the second media item adjacent a still image of a third media item when image processing of the third media item is incomplete.

In other examples of method 500, the method may begin by searching a persistent data storage for multiple media items that each comprise a still image and a video clip and modifying video content of each of the multiple media items before presenting a respective media item in the first portion of the user interface. The modifications may involve performing image stabilization on the first media item after retrieving the first media item from persistent data storage. The image stabilization may be performed by a computing process that is separate from a computing process that initiates a capture and processes the first media item and the second media item. The image stabilization may crop and zoom a portion of a video clip of the first media item to reduce movement of an object without changing the dimensions of the portion of the video clip. The image stabilization may also trim a portion of a video clip of the first media item in response to detecting movement that exceeds a predefined threshold, wherein the portion of the video clip that is trimmed is at the end of the video clip.

At block 504, the processing device may receive user input indicating a selection of the first media item in the first portion of the user interface. The user input may be of a first type, a second type, or a third type, which may comprise swiping gestures in different directions. In one example, the method may include receiving additional user input and in response to determining that the additional user input is of a second type, scrolling the plurality of media items in the first portion of the user interface. In another example, the processing device may determine that the additional user input is of a third type and remove the first media item from the first portion of the user interface.

At block 506, the processing device may in response to determining that the user input is of a first type, may add the first media item to a set of selected media items and present the set of selected media items in a second portion of the user interface. The first portion of the user interface and the second portion of the user interface may be displayed concurrently and the second portion of the user interface may display still images of the set of selected media items. In one example, the first portion of the user interface enables scrolling along a first axis and the second portion of the user interface enables scrolling along a second axis, wherein the first axis and the second axis are perpendicular axes.

Figure 6:
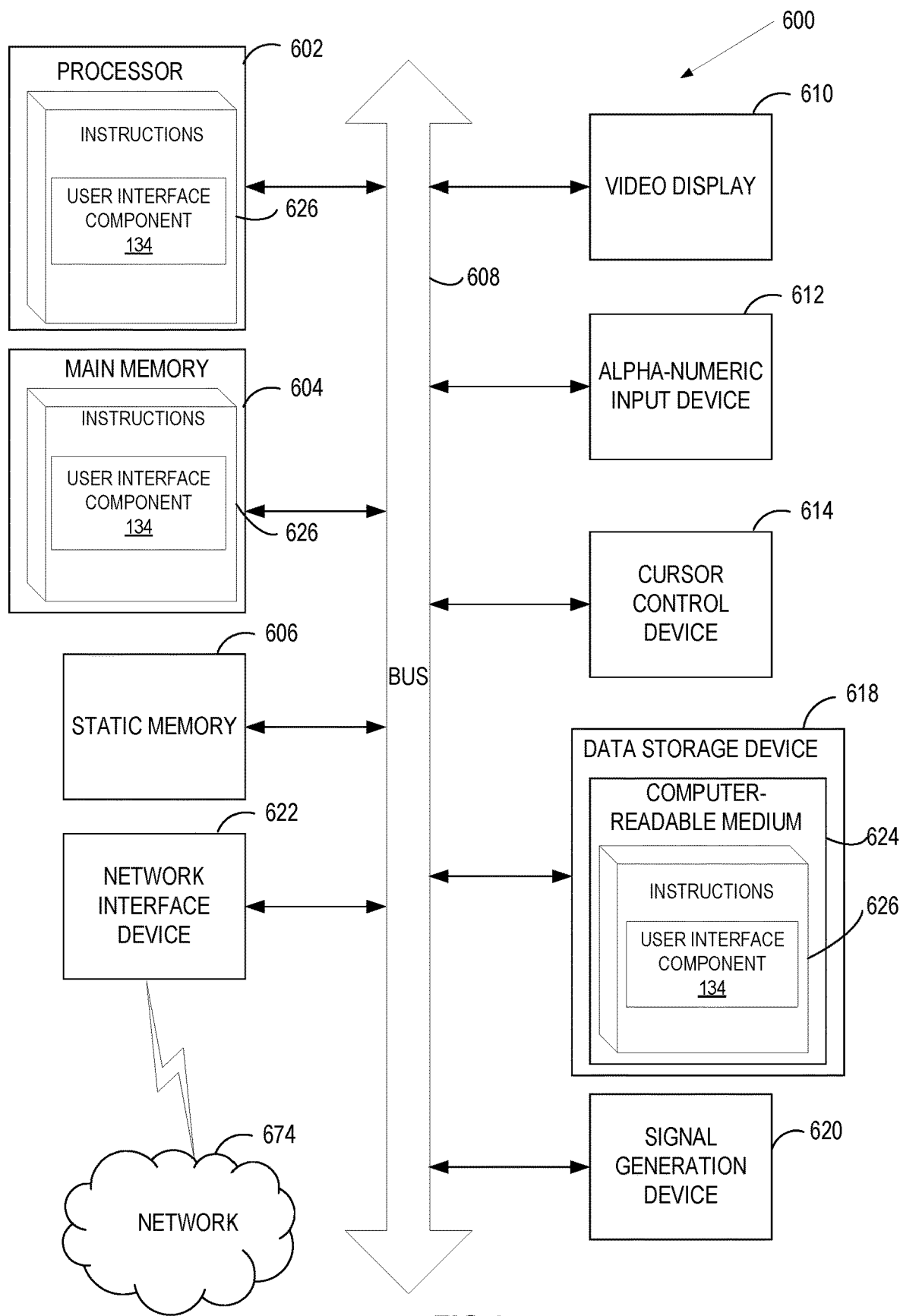
FIG. 6 is a block diagram illustrating an exemplary computer system in accordance with an implementation of the disclosure.

At block 508, the processing device may create the video from the set of selected media items. Creating the video from the set of selected media items may involve combining a video clip of the first media item and a video clip of a second media item. Responsive to completing the operations described herein above with references to block 508, the method may terminate FIG. 6 depicts a block diagram of a computer system operating in accordance with one or more aspects of the present disclosure. In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding user interface component 134 of FIG. 2 and for implementing method 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "releasing," "destroying," "initiating," "creating," "abandoning," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   presenting, by a processing device, a user interface facilitating a creation of a video from a plurality of media items that comprise video content, wherein the plurality of media items comprise a first media item and a second media item and the user interface displays the first media item and the second media item in a first portion of the user interface;
   receiving user input in the first portion of the user interface, wherein the user input comprises a selection of the first media item;
   upon receiving the user input, updating the user interface to comprise a control element and a second portion, and adding the first media item to a set of selected media items, wherein the second portion displays image content of the set of selected media items and wherein the control element enables a user to initiate the creation of the video based on the set of selected media items; and
   creating the video based on video content of the set of selected media items.

2. The method of claim 1, wherein the first media item comprises a still image and a video clip that are captured in parallel, wherein the still image is displayed in the second portion and wherein the video clip is played in the first portion and comprises video content from before and after the still image is captured.

3. The method of claim 2, wherein the still image of the first media item and the video clip of the first media item are linked together and are stored in different formats.

4. The method of claim 1, wherein the first portion of the user interface and the second portion of the user interface are displayed concurrently, the second portion of the user interface displaying a still image for each media item in the set of selected media items.

5. The method of claim 4, wherein the first portion of the user interface enables scrolling along a first axis and the second portion of the user interface enables scrolling along a second axis, wherein the first axis and the second axis are perpendicular axes.

6. The method of claim 1, wherein the user input comprises user input of a first type and wherein the method of claim 1 further comprises:
   receiving additional user input;
   in response to determining that the additional user input is of a second type, scrolling the plurality of media items in the first portion of the user interface; and
   in response to determining that the additional user input is of a third type, removing the first media item from the first portion of the user interface.

7. The method of claim 6, wherein the first type, the second type, and the third type of user inputs comprise swiping gestures in different directions.

8. The method of claim 1, wherein the first media item and the second media item playing in the first portion of the user interface are looping video clips for the first media item and the second media item.

9. The method of claim 2, wherein the first portion of the user interface presents a playing video clip of the second media item adjacent a still image of a third media item when image processing of the third media item is incomplete.

10. The method of claim 1, further comprising: performing image stabilization on the first media item after retrieving the first media item from persistent data storage.

11. The method of claim 10, wherein the image stabilization is performed by a computing process that is separate from a computing process that initiates a capture of the first media item.

12. The method of claim 10, wherein the image stabilization crops and zooms a portion of a video clip of the first media item to reduce movement of an object without changing dimensions of the portion of the video clip.

13. The method of claim 10, wherein the image stabilization trims a portion of a video clip of the first media item in response to detecting movement that exceeds a predefined threshold, wherein the portion of the video clip that is trimmed is at an end of the video clip.

14. The method of claim 1, further comprising:
   searching a persistent data storage for multiple media items that each comprise a still image and a video clip; and
   modifying video content of each video clip of the multiple media items before presenting a respective media item in the first portion of the user interface.

15. The method of claim 1, wherein the creating the video comprises combining a video clip of the first media item and a video clip of the second media item.

16. A client device comprising:
   a memory; and
   a processing device communicably coupled to the memory, wherein the processing device is to:
   present a user interface facilitating a creation of a video from a plurality of media items that comprise video content, wherein the plurality of media items comprise a first media item and a second media item and the user interface displays the first media item and the second media item in a first portion of the user interface;

receive user input in the first portion of the user interface, wherein the user input comprises a selection of the first media item;

upon receiving the user input, update the user interface to comprise a control element and a second portion, and add the first media item to a set of selected media items, wherein the second portion displays image content of the set of selected media items and wherein the control element enables a user to initiate the creation of the video based on the set of selected media items; and create the video from the set of selected media items.

17. The client device of claim 16, wherein the first media item comprises a still image and a video clip that are captured in parallel, wherein the still image is displayed in the second portion and wherein the video clip is played in the first portion and comprises video content from before and after the still image is captured.

18. The client device of claim 17, wherein the still image of the first media item and the video clip of the first media item are linked together and are stored in different formats.

19. A non-transitory machine-readable storage medium storing instructions which, when executed, cause a processing device to perform operations comprising:

presenting, by the processing device, a user interface facilitating a creation of a video from a plurality of media items that comprise video content, wherein the plurality of media items comprise a first media item and a second media item and the user interface displays the first media item and the second media item in a first portion of the user interface;

receiving user input in the first portion of the user interface, wherein the user input comprises a selection of the first media item;

upon receiving the user input, updating the user interface to comprise a control element and a second portion, and adding the first media item to a set of selected media items, wherein the second portion displays image content of the set of selected media items and wherein the control element enables a user to initiate the creation of the video based on the set of selected media items; and creating the video based on video content of the set of selected media items.

20. The non-transitory machine-readable storage medium of claim 19, wherein the first media item comprises a still image and a video clip that are captured in parallel, wherein the still image is displayed in the second portion and wherein the video clip is played in the first portion and comprises video content from before and after the still image is captured.

* * * * *